(12) United States Patent
Edwards et al.

(10) Patent No.: US 6,684,180 B2
(45) Date of Patent: Jan. 27, 2004

(54) APPARATUS, SYSTEM AND METHOD FOR REPORTING FIELD REPLACEABLE UNIT REPLACEMENT

(75) Inventors: Mark S. Edwards, Austin, TX (US); Margaret E. Gretta, Austin, TX (US); Arthur J. Tysor, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 09/801,620

(22) Filed: Mar. 8, 2001

(65) Prior Publication Data

US 2002/0138235 A1 Sep. 26, 2002

(51) Int. Cl.$^7$ ............................................... G06F 17/00
(52) U.S. Cl. ........................................ 702/184; 705/28
(58) Field of Search .................... 702/81–84, 182–187; 705/14, 22–23, 26–29; 714/4, 11, 712

(56) References Cited

U.S. PATENT DOCUMENTS

| | | | | |
|---|---|---|---|---|
| 5,122,959 A | * | 6/1992 | Nathanson et al. | ......... 701/117 |
| 5,216,612 A | * | 6/1993 | Cornett et al. | ................. 700/96 |
| 5,253,184 A | * | 10/1993 | Kleinschnitz | ................ 702/184 |
| 5,293,556 A | * | 3/1994 | Hill et al. | .................... 702/184 |
| 5,386,551 A | * | 1/1995 | Chikira et al. | ................. 714/46 |
| 5,428,619 A | * | 6/1995 | Schwartz et al. | ........... 714/712 |
| 5,561,760 A | * | 10/1996 | Ferris et al. | ................... 714/25 |
| 5,675,724 A | * | 10/1997 | Beal et al. | ...................... 714/4 |
| 5,790,780 A | * | 8/1998 | Brichta et al. | .................. 714/4 |
| 6,154,728 A | * | 11/2000 | Sattar et al. | ................... 705/28 |
| 6,338,045 B1 | * | 1/2002 | Pappas | ......................... 705/29 |

* cited by examiner

Primary Examiner—Marc S. Hoff
Assistant Examiner—Mary Catherine Baran
(74) Attorney, Agent, or Firm—Duke W. Yee; Volel Emile; Wayne P. Bailey

(57) ABSTRACT

An apparatus, system and method for reporting field replaceable unit (FRU) replacements to a user are provided. The apparatus, system and method identify a FRU Replacement Order for an identified system error and then determines which of the FRUs in the FRU Replacement Order have already been replaced within a predetermined period of time from the current time. Those FRUs identified as having already been replaced are then flagged. The FRU Replacement Order is then output to the user with the flagged FRUs being output in a different manner than the other FRUs in the FRU Replacement Order.

30 Claims, 3 Drawing Sheets

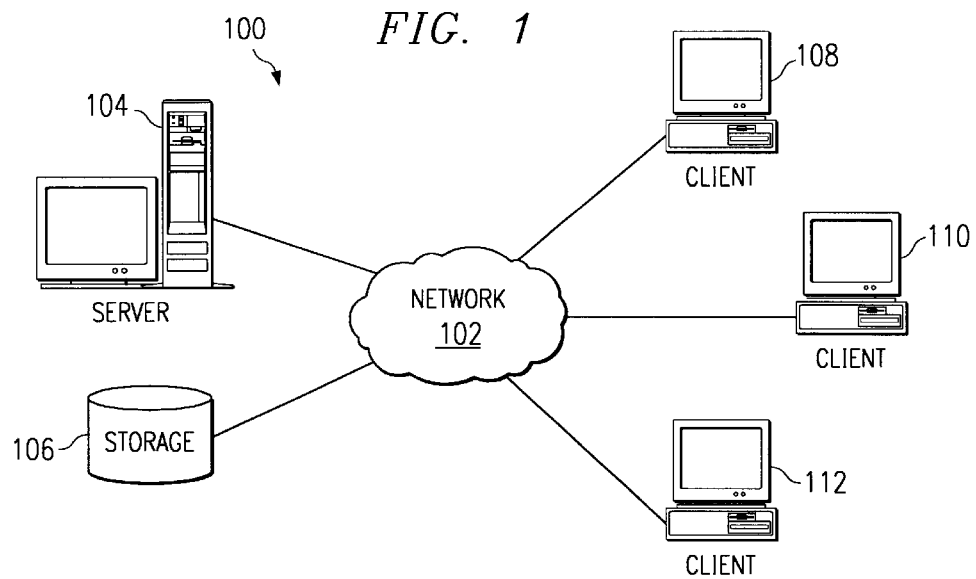
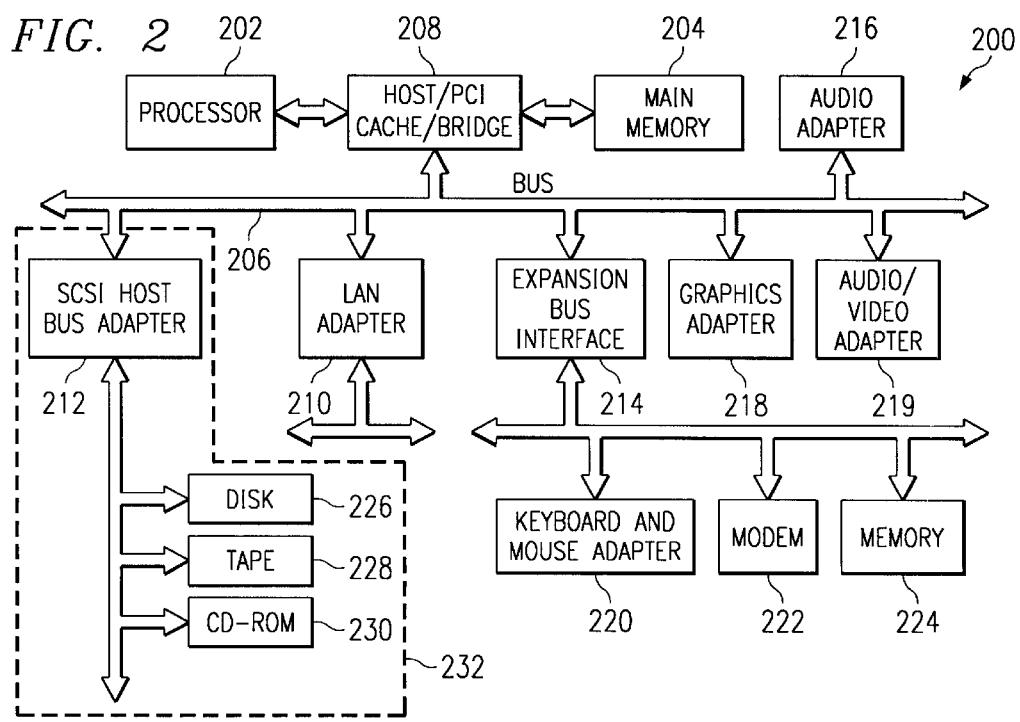

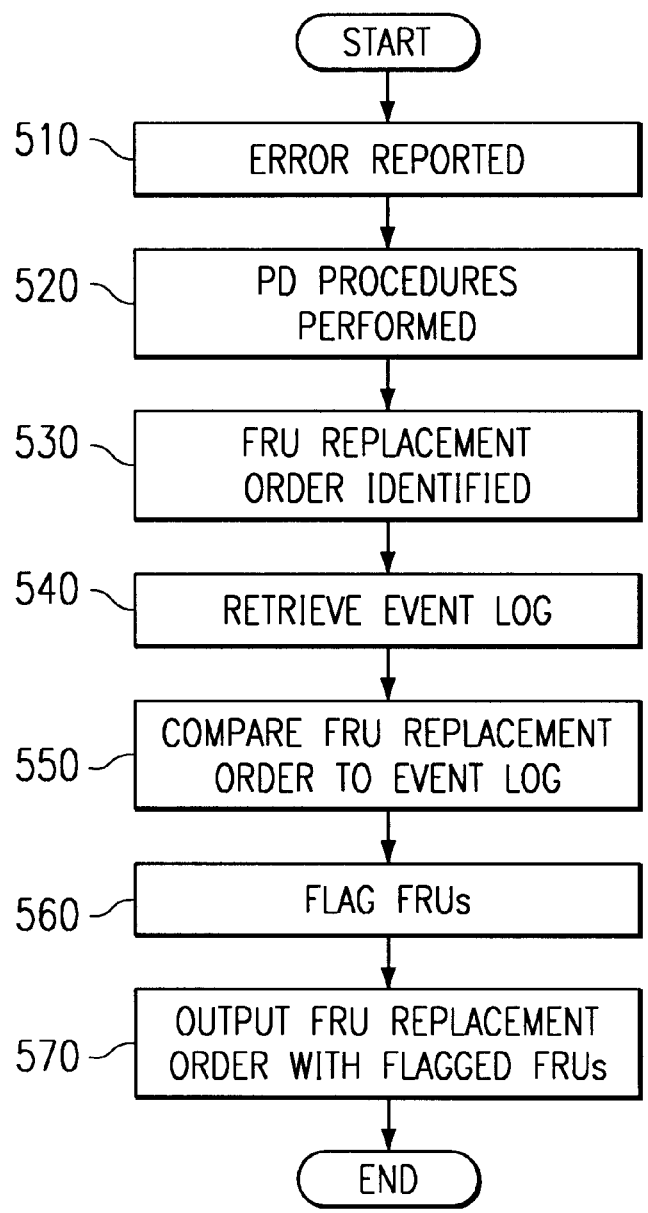

APPARATUS, SYSTEM AND METHOD FOR REPORTING FIELD REPLACEABLE UNIT REPLACEMENT

BACKGROUND OF THE INVENTION

1. Technical Field

The present invention is directed to an apparatus, system and method for reporting field replaceable unit (FRU) replacement. In particular the present invention is directed to an apparatus, system and method for informing a user which FRUs, that may be the source of a system error, have already been replaced within a given period of time.

2. Description of Related Art

As computer systems get more and more complex, it becomes increasingly difficult to isolate a fault to a particular field replaceable unit (FRU), e.g., a network card, sound card, video card, modem, and the like. For example, several processor cards can plug into and make use of a common system bus where additional memory modules may also be plugged into the common system bus. If a fault occurs on a memory controller, the fault can appear to be caused by a fault on itself or one of the FRUs of the common bus.

Today, diagnostic tests and/or real time error detectors are used to detect and attempt to isolate the fault. These tests and error detectors provide a set of symptoms that are used in the fault isolation. When developing the diagnostics, each of the symptoms is mapped to a FRU bucket, i.e., a collection of probable FRUs. The ideal FRU bucket contains a single FRU. However, in reality, many FRU buckets will consist of more than one FRU since a symptom may be the result of a failure of any of a number of FRUs.

When a FRU bucket contains more than one FRU, the FRUs are listed in a failure probability order. This failure probability order is referred to as the FRU Replacement Order and typically lists the most probable source of a failure first in the FRU bucket with other FRUs listed in decreasing probability of source of failure.

When a failure is to be cured, FRUs are replaced one at a time in the order set forth in the FRU Replacement Order until the failure is cured and the failure source is identified. A problem exists, however, if a FRU in the FRU Replacement Order has already been replaced recently. The problem is that, in most cases, a system error could be intermittent. Thus, repeatedly replacing a FRU may make the problem go away temporarily but does not provide a permanent solution to the problem.

Furthermore, if there is more than one customer engineer working on a system, a second customer engineer may not be aware that a first engineer has already replaced a particular FRU only a few days, weeks, etc., before. Normally, customer engineers log their actions in a binder that is kept physically next to the system under repair. However, this manner of logging replacements of FRUs proves troublesome in that the log binder may be overlooked, lost, or not maintained in an up-to-date manner.

Thus, it would be beneficial to have a method and apparatus for reporting FRU replacement to a subsequent customer engineer. It would further be beneficial to have a method and apparatus for logging FRU replacement automatically such that the FRU log is automatically retrievable by a customer engineer. Moreover, it would be beneficial to have an apparatus and method for providing a customer engineer with a FRU Replacement Order that takes into consideration whether a FRU has been previously replaced within a predetermined period of time.

SUMMARY OF THE INVENTION

The present invention provides an apparatus, system and method for reporting field replaceable unit (FRU) replacements to a user. The present invention identifies a FRU Replacement Order for an identified system error and then determines which of the FRUs in the FRU Replacement Order have already been replaced within a predetermined period of time from the current time. Those FRUs identified as having already been replaced are then flagged. The FRU Replacement Order is then output to the user with the flagged FRUs being output in a different manner than the other FRUs in the FRU Replacement Order.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary diagram of a distributed data processing system in which the present invention may be implemented;

FIG. 2 is an exemplary block diagram of a data processing system in which the present invention may be implemented;

FIG. 5 is a flowchart illustrating an exemplary operation according to the present invention.

DETAILED DESCRIPTION OF THE PREFERRED EMBODIMENT

Figure 3:
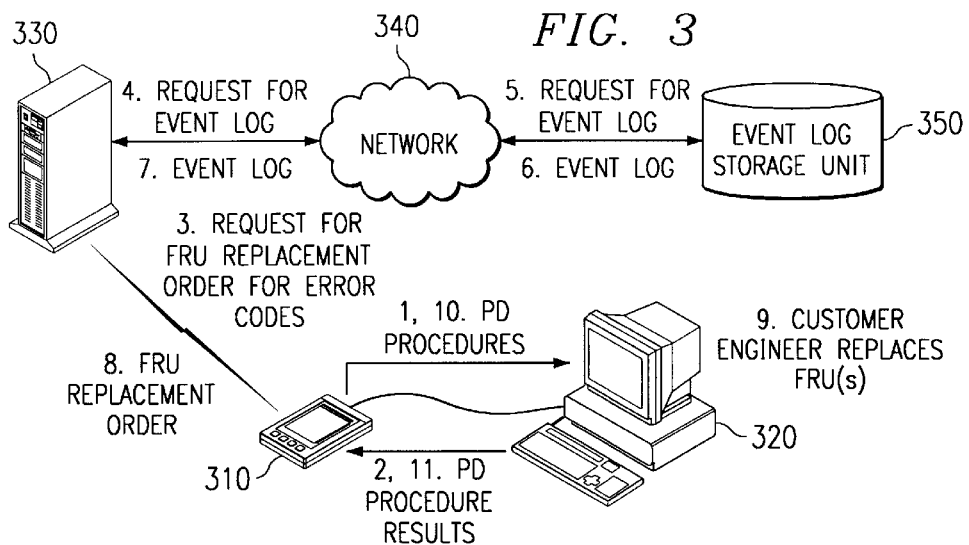
FIG. 3 is a diagram illustrating a data flow according to the present invention.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections. In the depicted example, a server 104 is connected to network 102 along with storage unit 106.

In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network.

In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

With reference now to FIG. 2, a block diagram of a data processing system is shown in which the present invention may be implemented. Data processing system 200 is an example of a computer in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a Web appliance.

The processes of the present invention may be performed by processor 202 using computer implemented instructions, which may be located in a memory such as, for example, main memory 204, memory 224, or in one or more peripheral devices 226–230. The present invention may be implemented solely on the data processing system shown in FIG. 2 or may be implemented in a distributed manner using the distributed data processing system of FIG. 1, as will be discussed hereafter. The present invention may be implemented as part of diagnostic tool embodied in software and/or hardware for diagnosing the source of a failure of a data processing system.

The present invention provides a mechanism through which a customer engineer, for example, may be provided with an indication of which field replaceable units (FRUs) have been replaced within a predetermined period of time. In this way, the customer engineer may be provided with information to help the customer engineer determine the most probable cause of an error in a data processing system. The present invention may be implemented in a stand alone device, such as the data processing system 200 or distributed amongst a plurality of devices in a distributed data processing system, such as distributed data processing system 100.

With the present invention, a customer engineer, or the like, in response to a service call, may initiate diagnostic procedures on a data processing system which is experiencing one or more error conditions. The particular diagnostic procedures may be any of those generally known in the art, or hereafter developed. These diagnostic procedures may be automatically performed, performed by the customer engineer, or may be a combination of procedures performed by the customer engineer and automatically by one or more diagnostic routines in a diagnostic tool according to the present invention.

Based on the results of the diagnostic procedures, a FRU bucket is identified for the errors encountered. The FRU bucket identifies the FRUs that are most likely the cause of the associated error. In addition, a FRU Replacement Order may be identified. The functions of performing diagnostic procedures, identifying a FRU bucket, and identifying a FRU Replacement Order are performed in substantially the same manner as known in the art.

In the prior art systems, the customer engineer may then take the FRU Replacement Order and begin replacing FRUs based on the FRU Replacement Order. With each replacement, the customer engineer may rerun the diagnostic procedures to determine if the error condition has been cured by replacement of the FRU. If not, the next FRU in the FRU Replacement Order may be replaced and the procedure repeated until the error condition is cured.

Thus, with the prior art systems, there is the possibility that FRUs that are not faulty may be replaced simply because the customer engineer is following the FRU Replacement Order. In addition, there is the possibility that a customer engineer may replace a FRU that has recently been replaced and thus, is less likely to be faulty.

In order to illustrate how such an occurrence might happen, consider the following scenario:

Mon: Bob, a customer engineer, goes to customer ACME who has reported a hardware problem. Bob runs Problem Determination (PD) Diagnostic Procedures and FRUs A and B are identified. Bob replaces FRU A, runs verification, and hardware problem appears to be solved.

Wed: Customer ACME calls back with another hardware problem. Customer engineer John runs PD procedures and discovers a problem that identifies FRU A and FRU C. John, not knowing that FRU A was replaced earlier, replaces FRU A, runs verification, and the hardware problem appears to be solved.

The present invention avoids such scenarios by providing a mechanism through which a customer engineer is informed of which FRUs have been replaced within a predetermined period of time. With the present invention, either before, after, or when the FRU Replacement Order is obtained after running problem determination diagnostic procedures, an event log is also retrieved from storage. The event log may be stored in a local memory that is local to the data processing system 200, for example. Alternatively, the event log may be uploaded to a remote data storage device, such as data storage unit 106, that may be accessible to a number of different customer engineers from a central site on the distributed data processing system 100, for example.

The event log stores records indicating the FRUs that have been replaced in a particular data processing system, the dates and/or times that the FRUs were replaced, and optionally, the errors encountered that led to the FRUs being replaced. The FRUs may be identified based on, for example, their vital product data (VPD) that is normally associated with the hardware devices. Such vital product data may include, for example, the serial number, part number, EC number, and the like, of the hardware device.

The event log is then compared against the results of the PD procedures. If there is a FRU in the results of the PD procedures that is indicated in the event log to have been replaced within a predetermined period of time from the current time, that FRU is flagged as having already been replaced. For example, assume the PD procedures results in an error code that corresponds to a FRU bucket that includes FRU A, FRU B, and FRU C. Also assume that the event log indicates that FRU B was replaced within 30 days of the current date. As a result, FRU B may be flagged as having already been replaced within the predetermined period of time (30 days). The particular period of time may be selected based on the particular data processing system being serviced, empirical failure rate data, industry convention, the judgment of a system administrator, customer engineer, or the like.

A display of the FRU Replacement Order is then provided to the customer engineer. The FRU Replacement Order display is different from the prior art displays in that those FRUs that have been flagged as having already been replaced, are displayed differently from the other FRUs in the FRU Replacement Order. The display may be provided using a display device associated with a device, such as the data processing system 200, being used by the customer engineer, for example. Thus, if the customer engineer is using a PDA version of data processing system 200, for example, the customer engineer is provided with a display on the PDA display screen that indicates the FRU Replacement Order with the flagged FRUs being displayed in a different manner from the non-flagged FRUs.

Displaying these flagged FRUs differently may include displaying them using a different text color, as highlighted text, as dimmed text, with a different graphical icon, with a graphical icon representing the FRU being already replaced (e.g., an exclamation point, a flag icon, the tag "Replaced," etc.), and the like.

In this way, the customer engineer is informed of which FRUs have already been replaced so that the customer engineer may replace other FRUs in the FRU Replacement Order prior to replacing the already replaced FRU. Thus, the likelihood of different customer engineers repeatedly replacing the same FRU within a predetermined period of time is minimized. In addition, temporary solutions to intermittent problems are avoided and thus, the intermittent problem is less likely to continue since the customer engineer must find the actual source of the intermittent problem.

FIG. 3 is an exemplary diagram illustrating a data flow amongst components of a distributed data processing system according to one exemplary embodiment of the present invention. As shown in FIG. 3, a customer engineer, using a data processing device 310 according to the present invention, runs PD procedures on the system 320 that is experiencing an error condition (1). The data processing system 310 receives the results of the PD procedures (2) and sends a request (3) for a corresponding FRU Replacement Order to the system maintenance server 330. The request sent to the system maintenance server 330 may include an indication of any error codes returned by the system 320 to the data processing system 310 as well as an identifier of the system 320, for example.

The system maintenance server 330 sends a request for the event log for the system 320 to the network 340 (4) which routes the request to the event log storage unit 350 (5). The event log storage unit 350 replies with the requested event log (6) which is again routed by the network 340 to the system maintenance server 330 (7). The system maintenance server 330 compares the event log to the standard FRU Replacement Order for the error conditions being experienced by the system 320. Any FRUs appearing in the standard FRU Replacement Order and in the event log (within a predetermined period of time) are flagged as having been replaced. The FRU Replacement Order with the flagged FRUs is then provided to the data processing system 310 (8).

A customer engineer views the FRU Replacement Order as it is displayed on the data processing system 310 and selects one or more FRUs to replace. The customer engineer replaces the selected one or more FRUs (9) in the system 320 and reruns the PD procedures (10). The results of the PD procedures are then output to the data processing system 310. If the results indicate that the error has not been cured, the process may be repeated as necessary.

If the results of the PD procedures indicate that the error has been cured, the vital product data for the replaced FRUs is entered into the diagnostic tool. This may include, for example, obtaining the vital product data by querying the replacement FRUs, having the customer engineer enter the vital product data via an input device associated with the data processing system 310, or the like. The vital product data may then be uploaded to the event log storage unit 350. Thus, the event log is updated with the most current replacement event data.

Figure 4:
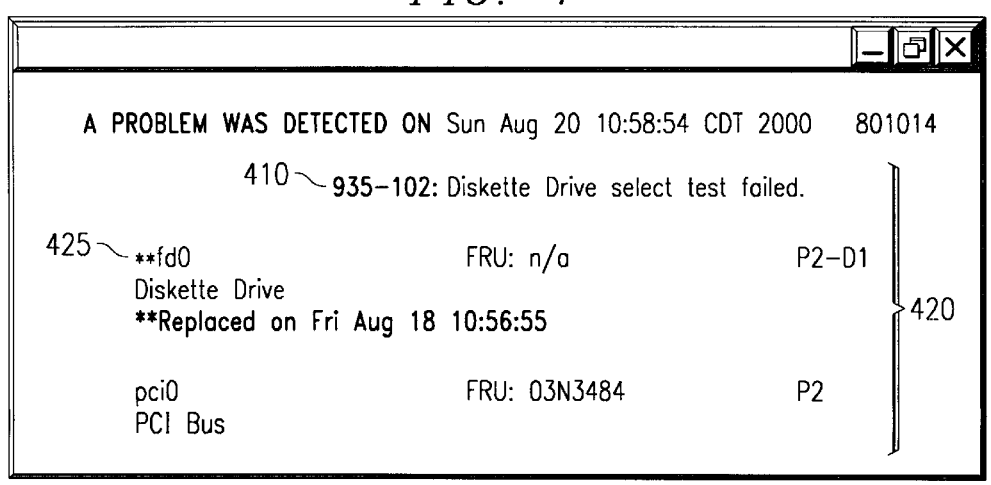
FIG. 4 is an exemplary diagram illustrating a display according to the present invention.

As described above, with the present invention a user is provided with a display that indicates which FRUs in the FRU Replacement Order have been previously replaced within a predetermined period of time. FIG. 4 is an exemplary diagram illustrating a display on a data processing system in accordance with the present invention. As shown in FIG. 4, the display includes an identifier of an error 410 and a listing of an FRU Replacement Order 420. Within the FRU Replacement Order 420, one or more FRUs may include flags 425 that identify the FRUs as having already been replaced within a predetermined period of time. In addition, information regarding when the FRUs were previously replaced may also be included.

FIG. 5 is a flowchart outlining an exemplary operation of one embodiment of the present invention. As shown in FIG. 5, the operation starts with an error condition in a system being reported (step 510). The customer engineer performs problem determination diagnostic procedures on the system (step 520) and a FRU Replacement Order is identified based on the results of the problem determination diagnostic procedures (step 530). An event log for the system is retrieved (step 540) and compared to the FRU Replacement Order (step 550). FRUs appearing in both the event log (within a predetermined time of the current time) and the FRU Replacement Order are flagged (step 560). The FRU Replacement Order is then output for use by the customer engineer (step 570). The operation then ends.

As mentioned above, the operation shown in FIG. 5 may be repeated until the error condition is cured by replacement of FRUs. With each iteration, the vital product data for FRUs already replaced may be entered and added to the event log for the system. In this way, the most current event log information is maintained in the event log storage unit.

It should be noted that while FIGS. 3–5 describe the present invention in terms of a distributed data processing system, the functionality of the present invention may be provided in a stand alone device, such as in a PDA, notebook computer, dedicated diagnostic device, or the like. In such an embodiment, rather than a maintenance server and event log storage unit being remotely accessible, these devices may be incorporated into the hardware/software of the stand alone device.

In addition, the present invention may make use of a combination of the stand alone device and distributed data processing system embodiments. In such an embodiment, the functionality described above may be provided by a stand alone device with periodic updates to a central event log storage device being made. Similarly, the system maintenance server may periodically transmit update data to one or more stand alone devices to thereby update their locally stored event logs. Other embodiments as will become apparent to those of ordinary skill in the art are intended to be within the spirit and scope of the present invention.

Moreover, while the present invention has been described in terms of providing a visual display on a display device of a data processing system, the invention is not limited to such an embodiment. Rather, the FRU Replacement Order and Flagged FRUs may be identified to a customer engineer, or other user, using audio, visual, and/or tactile output. For example, an audio message may be output indicating the FRU Replacement Order and the status of a FRU as having already been replaced.

As a further embodiment of the present invention, rather than only outputting an identifier indicating an FRU as having been previously replaced within a predetermined period of time, the present invention may modify the FRU Replacement Order based on the determination that a FRU has been previously replaced. For example, if an FRU in a FRU Replacement Order is determined to have already been replaced within a predetermined period of time, the ranking of the FRU in the FRU Replacement Order may be reduced. Such reduction may be to place the FRU at the end of the FRU Replacement Order, reduce the FRU priority in the FRU Replacement Order by a designated amount, or the like. The FRU Replacement Order then output to the customer engineer will be the modified FRU Replacement Order which may also include the flags as previously described.

Thus, the present invention provides a mechanism by which a customer engineer, or other user, may be informed of the FRUs that have been replaced within a predetermined period of time from the current time. In this way, the customer engineer may make an informed decision as to which FRU to replace in view of the fact that one or more of the FRUs may have already been replaced recently. In addition, since the identification of the recently replaced FRUs is performed by a data processing system utilized by the customer engineer in performing the problem determination diagnostic procedures, the possibility of misplacing the event log of a system is greatly reduced. Moreover, if a centralized event log is utilized, multiple customer engineers may access the same event log information and may receive the most current event log information. In addition, the present invention eliminates the need to maintain separate physical log books at each system being maintained.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution.

Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of outputting a field replaceable unit (FRU) replacement order, comprising:

determining a first FRU replacement order having at least one FRU;

determining if one or more of the at least one FRU has previously been replaced within a past predetermined period of time; and outputting a second FRU replacement order if one or more of the at least one FRU has been replaced within the past predetermined period of time.

2. The method of claim 1, wherein the second FRU replacement order includes the first FRU replacement order with FRUs identified as having previously been replaced within the past predetermined period of time being flagged.

3. The method of claim 1, wherein the second FRU replacement order is a modified version of the first FRU replacement order, modified based on the determination of one or more of the at least one FRU having previously been replaced within the past predetermined period of time.

4. The method of claim 1, further comprising performing one or more diagnostic procedures on a data processing system, wherein the step of determining a first FRU replacement order is performed based on results of performing the one or more diagnostic procedures on the data processing system.

5. The method of claim 1, wherein determining if one or more of the at least one FRU has previously been replaced within the past predetermined period of time includes retrieving an event log from one of a local memory or a remote storage device.

6. The method of claim 5, wherein the event log stores at least one event log record indicating one or more replaced FRUs that have previously been replaced in a data processing system and at least one of a date that the one or more replaced FRUs were previously replaced and an indicator of errors encountered that led to the one or more replaced FRUs being replaced.

7. The method of claim 6, wherein the one or more previously replaced FRUs are identified in the event log records by vital product data associated with the one or more replaced FRUs.

8. The method of claim 7, wherein the vital product data includes one or more of a serial number, a part number, and an EC number.

9. The method of claim 5, wherein determining if one or more of the at least one FRU has previously been replaced within the past predetermined period of time further includes comparing the event log to the first FRU replacement order.

10. The method of claim 1, wherein FRUs identified as having previously been replaced within the past predetermined period of time are output in the second FRU replacement order in a different manner from FRUs that are not identified as having previously been replaced within the past predetermined period of time.

11. The method of claim 10, wherein the different manner is one of a different text color, highlighted text, dimmed text, a different graphical icon, and a graphical icon representing the FRU being already replaced.

12. An apparatus for outputting a field replaceable unit (FRU) replacement order, comprising:
means for determining a first FRU replacement order having at least one FRU;
means for determining if one or more of the at least one FRU has previously been replaced within a past predetermined period of time; and
means for outputting a second FRU replacement order if one or more of the at least one FRU has previously been replaced within the past predetermined period of time.

13. The apparatus of claim 12, wherein the second FRU replacement order includes the first FRU replacement order with FRUs identified as having previously been replaced within the past predetermined period of time being flagged.

14. The apparatus of claim 12, wherein the second FRU replacement order is a modified version of the first FRU replacement order, modified based on the determination of one or more of the at least one FRU having previously been replaced within the past predetermined period of time.

15. The apparatus of claim 12, further comprising means for performing one or more diagnostic procedures on a data processing system, wherein the means for determining a first FRU replacement order operates based on results of performing the one or more diagnostic procedures on the data processing system.

16. The apparatus of claim 12, wherein the means for determining if one or more of the at least one FRU has previously been replaced within the past predetermined period of time includes means for retrieving an event log from one of a local memory or a remote storage device.

17. The apparatus of claim 16, wherein the event log stores at least one event log record indicating one or more replaced FRUs that have previously been replaced in a data processing system and at least one of a date that the one or more replaced FRUs were previously replaced and an indicator of errors encountered that led to the one or more replaced FRUs being replaced.

18. The apparatus of claim 16, wherein the means for determining if one or more of the at least one FRU has previously been replaced within the past predetermined period of time further includes means for comparing the event log to the first FRU replacement order.

19. The apparatus of claim 12, wherein FRUs identified as having previously been replaced within the past predetermined period of time are output in the second FRU replacement order in a different manner from FRUs that are not identified as having previously been replaced within the past predetermined period of time.

20. The apparatus of claim 19, wherein the different manner is one of a different text color, highlighted text, dimmed text, a different graphical icon, and a graphical icon representing the FRU being already replaced.

21. A computer program product in a computer readable medium for outputting a field replaceable unit (FRU) replacement order, comprising:
first instructions for determining a first FRU replacement order having at least one FRU;
second instructions for determining if one or more of the at least one FRU has previously been replaced within a past predetermined period of time; and
third instructions for outputting a second FRU replacement order if one or more of the at least one FRU has previously been replaced within the past predetermined period of time.

22. The computer program product of claim 21, wherein the second FRU replacement order includes the first FRU replacement order with FRUs identified as having been previously replaced within the past predetermined period of time being flagged.

23. The computer program product of claim 21, wherein the second FRU replacement order is a modified version of the first FRU replacement order, modified based on the determination of one or more of the at least one FRU having previously been replaced within the past predetermined period of time.

24. The computer program product of claim 21, further comprising fourth instructions for performing one or more diagnostic procedures on a data processing system, wherein the first instructions determining a first FRU replacement order execute based on results of performing the one or more diagnostic procedures on the data processing system.

25. The computer program product of claim 21, wherein the second instructions include instructions for retrieving an event log from one of a local memory or a remote storage device.

26. The computer program product of claim 25, wherein the event log stores at least one event log record indicating one or more replaced FRUs that have previously been replaced in a data processing system and at least one of a date that the one or more replaced FRUs were previously replaced and an indicator of errors encountered that led to the one or more replaced FRUs being replaced.

27. The computer program product of claim 25, wherein the second instructions further include instructions for comparing the event log to the first FRU replacement order.

28. The computer program product of claim 21, wherein FRUs identified as having previously been replaced within the past predetermined period of time are output in the second FRU replacement order in a different manner from FRUs that are not identified as having previously been replaced within the past predetermined period of time.

29. The computer program product of claim 28, wherein the different maimer is one of a different text color, highlighted text, dimmed text, a different graphical icon, and a graphical icon representing the FRU being already replaced.

30. An apparatus for outputting a field replaceable unit (FRU) replacement order, comprising:

a diagnostic tool; and an output device coupled to the diagnostic tool, wherein the diagnostic tool determines a first FRU replacement order having at least one FRU, determines if one or more of the at least one FRU has previously been replaced within a past predetermined period of time, and instructs the output device to output a second FRU replacement order if one or more of the at least one FRU has previously been replaced within the past predetermined period of time.

* * * * *